United States Patent [19]
Sawabe et al.

[11] Patent Number: 4,541,817
[45] Date of Patent: * Sep. 17, 1985

[54] DRIVE SHAFT ASSEMBLY

[75] Inventors: Masaki Sawabe, Okazaki; Tadanobu Kumagai, Toyota, both of Japan

[73] Assignee: Toyota Jidosha Kogyo Kabushiki Kaisha, Toyota, Japan

[*] Notice: The portion of the term of this patent subsequent to Mar. 13, 2001 has been disclaimed.

[21] Appl. No.: 392,605

[22] Filed: Jun. 28, 1982

[30] Foreign Application Priority Data

Oct. 6, 1981 [JP] Japan .............................. 56-147726[U]

[51] Int. Cl.⁴ ......................... F16D 3/20; F16D 3/30; F16L 23/00
[52] U.S. Cl. .................................... 464/111; 403/337; 464/124
[58] Field of Search ............... 464/111, 122, 123, 124, 464/905, 137; 403/288, 336, 337

[56] References Cited

U.S. PATENT DOCUMENTS

| | | | |
|---|---|---|---|
| 1,987,678 | 1/1935 | Goddard et al. | 464/124 |
| 2,722,115 | 11/1955 | Dunn | 464/124 |
| 2,803,474 | 4/1957 | Wilson | 464/137 X |
| 2,825,213 | 3/1958 | Dunn | 464/124 |
| 3,008,311 | 11/1961 | Mazziotti | 464/123 |
| 3,028,924 | 4/1962 | Cooper | 464/124 X |
| 3,318,108 | 5/1967 | Cadiou | 464/111 X |
| 4,010,625 | 3/1977 | Orain | 464/123 X |
| 4,083,202 | 4/1978 | Westercamp | 464/123 |
| 4,436,310 | 3/1984 | Sawabe et al. | 277/11 |

FOREIGN PATENT DOCUMENTS 2605459  8/1977  Fed. Rep. of Germany ...... 464/111

*Primary Examiner*—Stuart S. Levy
*Assistant Examiner*—Daniel P. Stodola
*Attorney, Agent, or Firm*—Oblon, Fisher, Spivak, McClelland & Maier

[57] ABSTRACT

A drive shaft assembly has a first shaft, a casing receiving an end portion of the first shaft through an opening at its one end and provided with a first flange on the periphery of the other end, a second shaft provided with a second flange to be joined with the first flange, and an end cover held between the first and second flanges and adapted to hold a sealing member in association with the first flange. The first and second flanges and end cover are respectively provided with bolt holes through which bolts extend. Two knock pins are secured to one of the first and second flanges and extend in an axial direction through knock pin holes in the end cover and are received in knock pin holes provided in the other flange. Centering of the first and second shafts can effectively be made by centering the first and second flanges by way of the knock pin engagement.

5 Claims, 3 Drawing Figures

F I G. 2
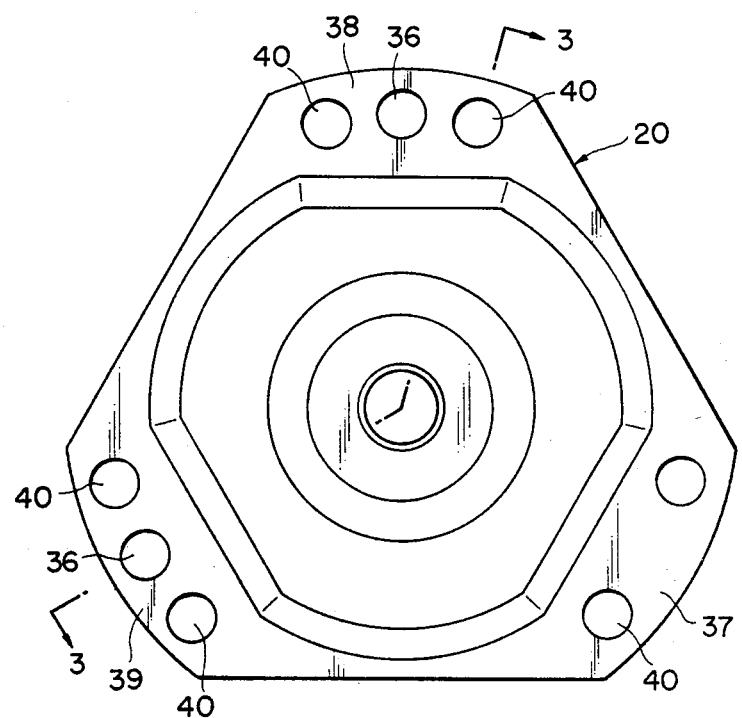

DRIVE SHAFT ASSEMBLY

BACKGROUND OF THE INVENTION

1. Field of the Invention

The present invention relates to a drive shaft assembly, and more particularly to a drive shaft assembly comprising a first shaft, a casing having two openings at its axial ends, receiving an end portion of the first shaft through the opening at one end and provided with a first flange on the periphery of the other end, a second shaft provided with a second flange to be joined to the first flange and an end cover with its periphery held between the first and second flanges and adapted to hold a sealing member in association with the first flange.

2. Description of the Prior Art

In a conventional drive shaft assembly of the so-called flange coupling type as mentioned above, the flanges are joined together by bolts and nuts. On the other hand, it is necessary to conduct the centering of the flanges for centering the first and second shafts, prior to joining the flanges. This centering is usually conducted with the use of a so-called faucet joint or a socket and spigot joint, in which a spigot provided on one flange is fit in a socket provided on the other flange. This centering method, however, has the following disadvantages.

The slipping of the joined surfaces of the two flanges due to the torque transmitted by one of the shafts is prevented solely by the frictional force between the flanges joined by bolts. Accordingly, in a case of high torque, it is necessary to use bolts having a larger size to prevent loosening of the bolts, and consequently, it is inevitable to enlarge the outer diameters of the flanges. This is disadvantageous especially for a drive shaft assembly of an automobile, where the space for installment is rather limited.

In a case of a drive shaft assembly in which an end cover is provided between the flanges, to close together with a sealing member one of the openings of the casing, it is necessary to form said socket and spigot along the outer peripheries of the respective flanges. Consequently, the outer diameters of the flanges will have to be made larger, thus leading to the same disadvantage from the viewpoint of space, as mentioned above.

SUMMARY OF THE INVENTION

Accordingly, it is an object of the present invention to provide a drive shaft assembly wherein the outer diameters of the flanges can be minimized.

The present invention provides a drive shaft assembly which comprises a first shaft, a casing having two openings at its axial ends, receiving an end portion of the first shaft through the opening at one end and provided with a first flange on the periphery of the other end, a second shaft provided with a second flange at one end to be joined to the first flange, and an end cover with its periphery held between the first and second flanges and adapted to hold a sealing member in association with the first flange. A plurality of knock pins are secured to one of the first and second flanges and extend in an axial direction toward the other flange. The other flange is provided with a plurality of knock pin holes to receive the knock pins, and the end cover is provided with a plurality of knock pin holes through which the knock pins extend. The first and second flanges and end cover are respectively provided with a plurality of corresponding bolt holes through which bolts extend and nuts are threaded on the bolts. Thus, the first and second flanges and the end cover are joined together by the knock pins and the bolts, whereby centering of the flanges for centering the first and second shafts can effectively be accomplished by the knock pin engagement.

The other objects and the features of the present invention will become apparent from the detailed description of the preferred embodiment with reference to the accompanying drawings.

BRIEF DESCRIPTION OF THE DRAWINGS

FIG. 2 is a front view of a flange provided on a second shaft, as viewed from the direction of line 2—2 of FIG. 1.

DESCRIPTION OF THE PREFERRED EMBODIMENTS

Figure 1:
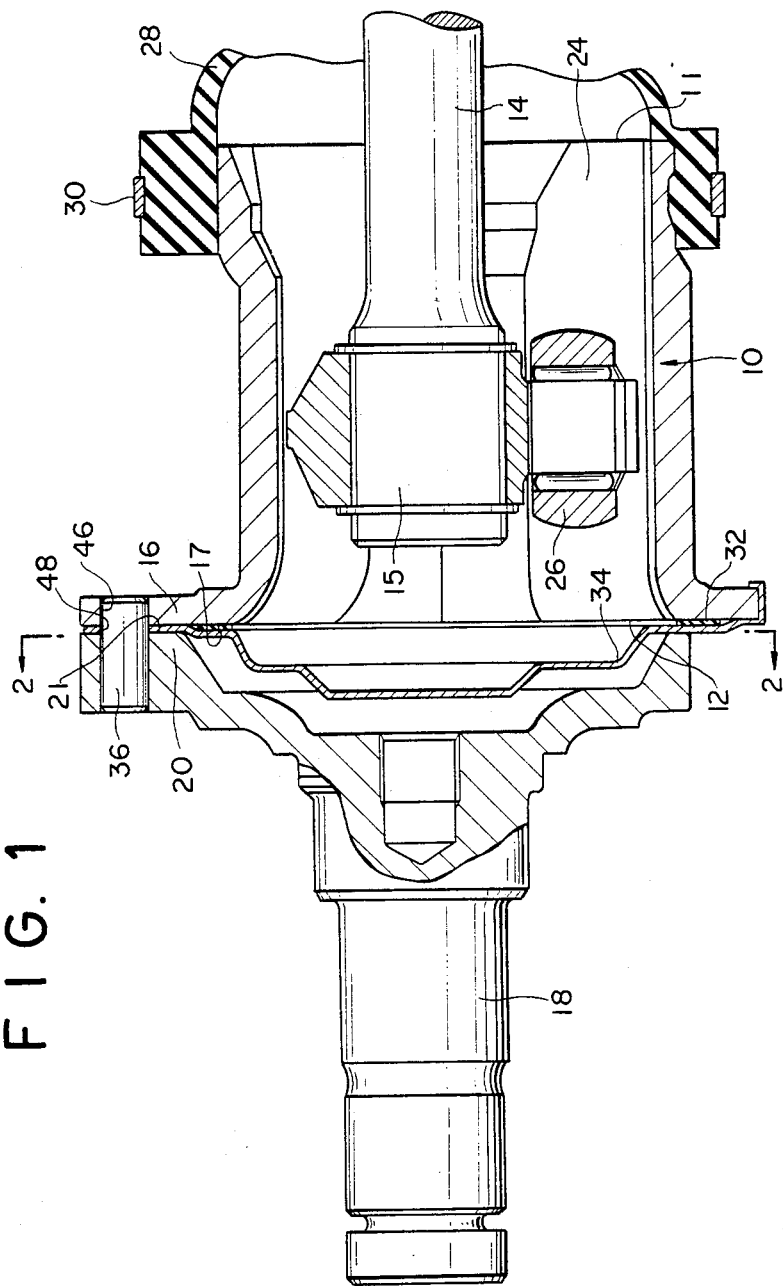
FIG. 1 is a cross sectional view of a drive shaft assembly of the present invention.

Referring to FIG. 1, a drive shaft assembly of the present invention comprises a first shaft 14, a casing 10 having two openings 11 and 12 at its axial ends, receiving an end portion 15 of the first shaft 14 through the opening 11 at one end and provided with a first flange 16 on the periphery of the other end, and a second shaft 18 provided with a second flange 20 to be joined to the first flange 16. The first shaft 14 and the second shaft 18 are connected via a uniform velocity joint.

In the illustrated embodiment, the casing 10 is designed for a tripod joint, and it has three internal grooves 24 formed circumferentially at equal intervals to receive rollers 26 arranged around the end portion 15 of the first shaft 14. A rubber boot 28 is put on the first shaft 14 and the end of the casing 10 at the opening 11. One end of the boot 28 is secured to the end of the casing 10 at the opening 11 by a clamp 30, and the other end of the boot 28 is likewise secured to the first shaft 14 by a clamp (not shown). Thus, grease enclosed in the casing 10 is sealed by this boot 28 at the side of the opening 11.

A Birfield joint may be used as the uniform velocity joint instead of the illustrated tripod joint. In the case of the tripod joint, the casing 10 is internally provided with three roller grooves, and the rotary means arranged around the end portion 15 of the first shaft 14 are rollers 26. In the case of the Birfield joint, the casing 10 is internally provided with six ball grooves, and the rotary means are balls. In either case, the configuration of the grooves and the manner of attaching the rotary means to the end portion of the first shaft may be those per se known in the art.

A sealing member 32 and an end cover 34 are disposed between the first flange 16 and the second flange 20 to seal the opening 12 of the casing 10 for preventing leakage of the grease from the casing. The sealing member 32 is made of rubber, and it is pressed against the joint surface 17 of the first flange 16 by the end cover 34. On the other hand, the periphery of the end cover 34 is disposed and held between the joint surface 17 of the first flange 16 and the joint surface 21 of the second flange 20. When the opening 12 of the casing is covered with such a sealing member and such an end cover, it is not possible to provide a socket and spigot joint on the joint surfaces of the flanges, and consequently a socket and spigot joint will have to be provided on the outer peripheries of the flanges, thus leading to the aforementioned disadvantages.

Figure 3:
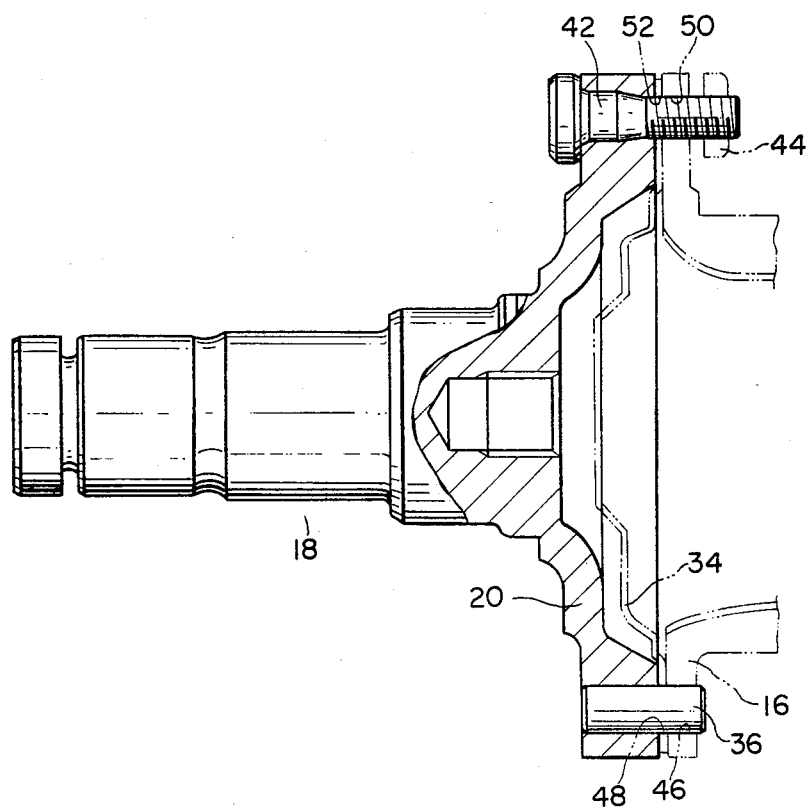
FIG. 3 is a cross sectional view taken along line 3—3 of FIG. 2.

As shown in FIGS. 2 and 3, according to the present invention, two knock pins 36 are secured to the second flange 20 provided on the second shaft 18, whereby centering of the flanges 16 and 20 for centering of the first shaft and the second shaft can be conducted by means of these knock pins 36. In the illustrated embodiment shown in FIG. 2, the second flange 20 is formed to have a generally triangular shape having three linear portions and three rounded corner portions 37, 38 and 39. In contrast, the first flange 16 and the end cover 34 are substantially circular in their shape. At two portions 38 and 39 of the rounded corner portions 37, 38 and 39, the two knock pins 36 are secured to the second flange 20 by press fitting and extend in an axial direction of the casing 10 toward the first flange 16. At both sides of the knock pins 36, there are provided bolt holes 40. At the remaining rounded corner portion 37, only two bolt holes 40 are provided. According to the present invention, the centering of the flanges 16 and 20 is conducted by means of the knock pins. For this purpose, the relative positioning of the knock pins 36 must be set with high accuracy. Accordingly, it is most preferred to use two knock pins. Three or more knock pins may be provided. In such a case, however, the relative precise positioning of the knock pins to one another will be extremely difficult, and the work involved therein will be cumbersome.

One may consider that as the flanges are joined by bolts and nuts, it may be possible to conduct the centering by means of the bolts. However, the clearance between a bolt hole and a bolt is generally much greater than the tolerance allowable for dislocation of the centers of the first and second shafts of a drive shaft assembly. Accordingly, it is impossible to conduct the centering by means of the bolts. However, according to the present invention, knock pins 36 are used for the centering, and it is thereby possible to adequately increase the accuracy in the relative positioning of the knock pins 36, the outer diameter accuracy of the knock pins and the inner diameter accuracy of the knock pin holes. Thus, the centering of the first and second flanges and the consequential centering of the first and second shafts can be done effectively by means of such knock pins. The outer diameters of the knock pins 36 may be set to be substantially the same as the outer diameters of the bolts 42.

In the above embodiment, the knock pins 36 are provided on the second flange 20 of the second shaft. This is preferred especially when the casing 10 is formed by pressing a cylindrical member instead of machining. This is so because, when the flange 16 is formed the thickness of the flange 16 is rather thin, i.e. the same thickness as that of the cylindrical member, and accordingly it is difficult to accurately position the knock pins on such a flange by press fitting, and proper centering can not thereby be attained. In a case where the casing 10 is prepared by machining, it is possible to accurately secure the knock pins on the flange of the casing by press fitting.

The first flange 16 provided on the casing 10 and the end cover 34 are respectively provided with knock pin holes 46 and 48 and bolt holes 50 and 52 (shown in FIG. 3) at respective positions corresponding to the above knock pins 36 and bolt holes 40. The knock pin holes 46 and 48 must be formed to have adequate precision with respect to their inner diameters and their relative positioning.

For assembling the drive shaft assembly of the present invention, it is preferred that bolts 42 are previously press fit in the bolt holes 40 of the second flange 20 to form stud bolts. The knock pins 36 of the second flange 20 are fit through the knock pin holes 48 of the end cover 34 and fit in the knock pin holes 46 of the first flange 16, whereby the centering of the first flange 16 and the second flange 20, and accordingly the centering of the first shaft 14 and the second shaft 18, can be accomplished. Then, nuts 44 are screwed on the bolts 42 to fasten the first and second flanges with the end cover therebetween.

According to the drive shaft assembly of the present invention, no socket and spigot joint is required for the centering of the flanges, and, therefore, the forming of the flanges by forging or machining can be facilitated. The slipping of the joint surfaces of the flanges due to high torque can be prevented by the knock pins, and the loosening of the bolts can thereby be adequately prevented. Further, the knock pins serve to bear the torque and, accordingly, the size of the bolts may be reduced. This, coupled with the elimination of the socket and spigot for the centering of the flanges, makes it possible to reduce the outer diameters of the flanges. Consequently, the drive shaft assembly occupies less space for installation, and, accordingly, freedom in the choice of the location for the installation of the drive shaft assembly will be increased.

What is claimed is:

1. A drive shaft assembly comprising:
    (a) a first shaft;
    (b) a casing surrounding said first shaft and having openings at each axial end thereof, said casing receiving an end portion of said first shaft through the opening at one end thereof and being provided with a first flange on the periphery of the other end, said first flange having first planar annular end surface perpendicular to the axis of said first shaft;
    (c) a second shaft which is coaxial with said first shaft and which is provided with a second flange at one end thereof, said second flange having a second planar annular end surface perpendicular to the axis of said second shaft;
    (d) an end cover having an annular planar periphery disposed between said first and second planar annular end surface, said end cover having two axial surfaces, one of which makes planar contact with said first planar annular end surface when the assembly is assembled and one of which makes planar contact with said second planar annular end surface when the assembly is assembled;
    (e) a sealing member sealingly held between said end cover and said first flange inwardly of said annular periphery of said end cover and said first planar annular end surface on said first flange when the assembly is assembled;
    (f) first means for quickly and accurately centering said first and second end flanges in precisely aligned coaxial relationship prior to joining said first and second flanges with bolts and nuts, said first means comprising:
        (i) two and only two knock pin receiving holes in each of said first and second flanges, said knock pin receiving holes being located at a uniform radial distance from said first and second shafts defining a first circle located in said first and second annular end surfaces and outside said sealing member, said two and only two knock pin receiving holes in said first flange being coaxial with said two and only two knock pin receiving holes in said second flange;

(ii) two and only two knock pin passing holes in said end cover, said two and only two knock pin passing holes being larger than said two and only two knock pin receiving holes in at least one of said first and second flanges and being coaxial with said knock pin receiving holes; and (iii) two and only two knock pins, each of said two and only two knock pins having a chamfer at each end thereof and, when the assembly is assembled, being secured by press fitting in corresponding ones of said two and only two knock pin receiving holes in said first and second flanges, said knock pins extending in the axial direction defined by said first and second shafts, said knock pins being sized and shaped to be closely received in said knock pin receiving holes to thereby precisely position said first and second end flanges in precisely aligned coaxial relationship; and (g) second means for joining said first and second flanges after they have been centered in precisely aligned coaxial relationship, said second means comprising:

(i) a plurality of corresponding bolt holes located in said first and second flanges and in said end cover on a second circle which is concentric to said first circle;

(ii) a plurality of bolts which, when the assembly is assembled, extend through said bolt holes, said bolts not being as closely received in said bolt holes as said knock pins are received in said knock pin holes in said first and second flanges; and (iii) a plurality of nuts which, when the assembly is assembled, are threadedly received on said bolts, whereby, during assembly of the drive shaft assembly:

(h) said first and secodd flanges and said end cover may be quickly and accurately centered in precisely aligned coaxial relationship by said two and only two knock pins, after which (i) said first and second flanges may be joined by said plurality of bolts and corresponding nuts, which prevent axial dislocation of said first and second flanges, and (j) after assembly of the drive shaft assembly, said two and only two knock pins and said plurality of bolts both transmit torque.

2. The drive shaft assembly as claimed in claim 1, wherein said knock pins are secured to the second flange by press fitting.

3. The drive shaft assembly as claimed in claim 2, wherein said casing is formed by pressing a cylindrical member and has three internal grooves formed circumferentially in equal interval, and three rollers arranged around the end portion of the first shaft are received respectively in said grooves.

4. The drive shaft assembly as claimed in claim 1, wherein said first and second flanges and said end cover are joined with their interfaces contacted closely.

5. The drive shaft assembly as claimed in claim 1 wherein said first and second circles have the same radius.

* * * * *